July 1, 1969  YIH-YUN HSU ETAL  3,453,462
SLUG FLOW MAGNETOHYDRODYNAMIC GENERATOR
Filed July 27, 1966
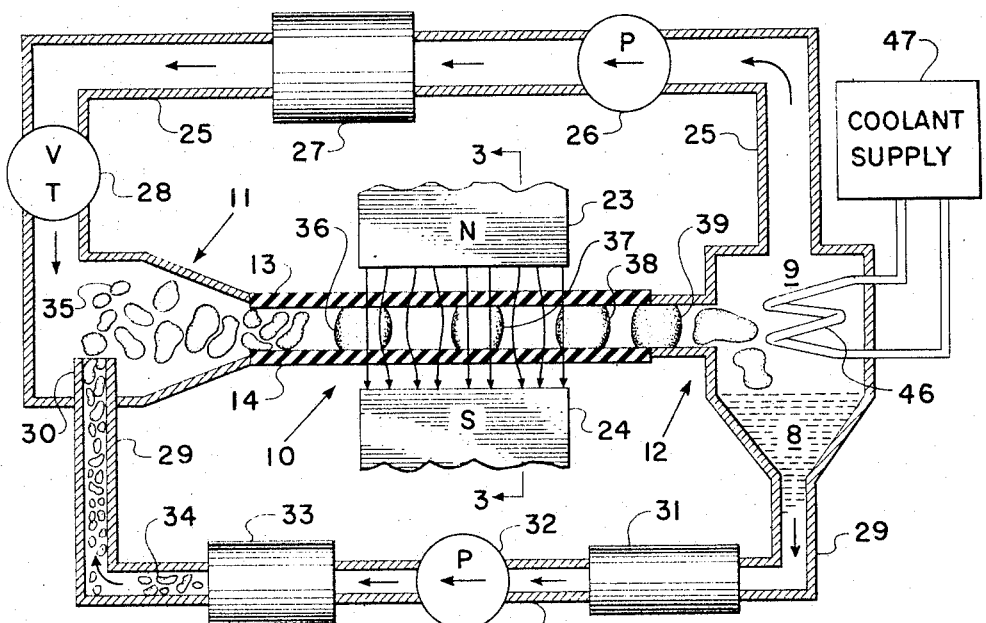
FIG. 1
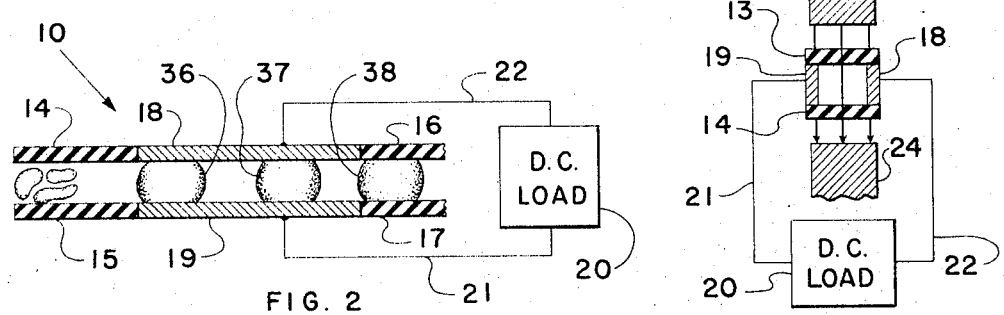
FIG. 2
FIG. 3
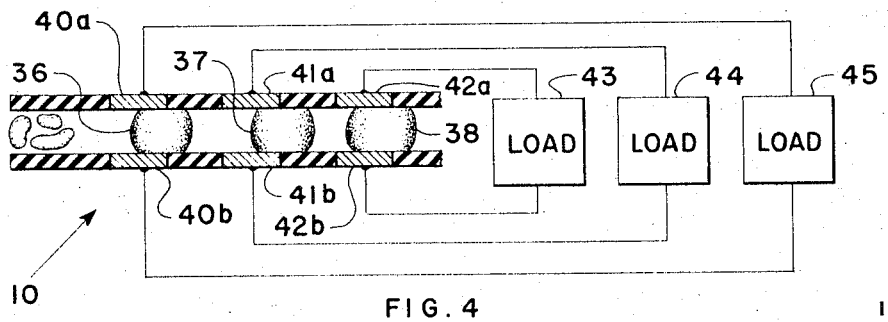
FIG. 4
INVENTORS
YIH-YUN HSU
JOHN W. DUNNING JR.
BY
Norman T. Musial
ATTORNEYS 3,453,462
SLUG FLOW MAGNETOHYDRODYNAMIC
GENERATOR
Yih-Yun Hsu, Berea, and John W. Dunning, Jr., Lakewood, Ohio, assignors to the United States of America as represented by the Administrator of the National Aeronautics and Space Administration
Filed July 27, 1966, Ser. No. 568,362
Int. Cl. H02n 4/02
U.S. Cl. 310—11                                     10 Claims

ABSTRACT OF THE DISCLOSURE

A magnetohydrodynamic generator in which a heated nonconductive gas of high kinetic energy and a liquid metal mist of high kinetic energy are directed from a mixing chamber to a magnetohydrodynamic generator in such proportions that the liquid metal coalesces into slugs of metal. The slugs of metal are separated by pockets of the nonconductive gas whose kinetic energy aids in the movement of the slugs through the magnetohydroynamic generator to generate an electric current at output electrodes of the generator. After leaving the generator, the slugs of metal are separated from the nonconductive gas. The liquid metal and the gas are recirculated through suitable heat exchangers to increase their respective kinetic energies.

---

The invention described herein was made by employees of the United States Government and may be manufactured and used by or for the Government for governmental purposes without the payment of any royalties thereon or therefor.

This invention relates to thermoelectric generators and is directed more particularly to a magnetohydrodynamic (MHD) type generator.

Basically a MHD generator produces electricity by directing an electrically conductive fluid through a duct in a magnetic field. The flow of fluid is in a direction perpendicular to that of the magnetic field and generates an E.M.F. between a pair of output electrodes positioned on opposite sides of the duct. If a load is connected between the electrodes, current will traverse the fluid from one electrode towards the other.

In some MHD generators the conductive fluid is comprised of a nonconductive gas which is heated to an extremely high temperature and seeded with a metal such as cesium to encourage ionization. Because of the high temperature and the ionized condition of the liquid, severe erosion of the electrodes occurs. Furthermore, such an ionized fluid comprising a seeded nonconductive gas can support only a relatively small current flow between the electrodes as compared to a liquid metal.

In another type of MHD generator, metallic liquid is mixed with a gas and the mixture increases in velocity as it passes through a nozzle. The liquid metal is then separated from the gas and directed through a duct in a magnetic field to generate an E.M.F. Such a device is inefficient because of the work done in separating the gas from the liquid upstream of the magnetic field.

Accordingly, it is an object of the invention to provide a novel MHD generator of high efficiency.

It is another object of the invention to provide an improved MHD generator which operates at a relatively low temperature.

It is a further object of the invention to provide a MHD generator in which a liquid metal and a nonconductive gas are not separated until after traversing the magnetic field. As a result, the kinetic energy of the gas aids the movement of the liquid metal through the magnetic field.

Still another object of the invention is to provide a MHD generator in which the liquid metal flow through the magnetic field is in the form of slugs separated by pockets of nonconductive gas. This slug flow facilitates separation of the liquid metal from the gas downstream of the magnetic field in addition to increasing the efficiency of the MHD generator.

It is yet another object of the invention to provide an improved MHD generator for supplying a plurality of pulsating D-C voltages to respective loads.

Briefly, the instant invention contemplates a structure for severally heating a nonconductive gas and a liquid metal. The gas is directed to a duct positioned in a magnetic field and having electrical output electrodes. The liquid metal is converted to a mist and mixed with the gas upstream of the duct. As the mixture enters the magnetic field, the metallic mist coalesces forming liquid metal slugs which are separated by pockets of the nonconductive gas. After passing through the duct, the liquid metal is separated from the gas and each is returned to its own heating means.

Other objects and advantages of the invention will become apparent from the following description and accompanying figures in which:

FIG. 1 is a schematic drawing of a MHD generator embodying the invention,

FIG. 2 is a sectional, top view of the duct structure,

FIG. 3 is a cross section of the duct in a magnetic field, and

FIG. 4 is a sectional, top view of a modified duct.

Referring now to FIG. 1, it will be seen that a MHD generator embodying the invention may generally include, by way of example, a duct 10, a mixing chamber 11 and a separator 12 having a liquid outlet and a gas outlet. A liquid metal 8 and a nonconductive gas 9 are contained in the separator 12 which may be of the cyclone type. The duct 10 is provided with a top and a bottom 13 and 14, respectively, of electrically nonconductive material. The sides of the duct, as shown in FIG. 2, may include nonconductive end portions 14, 15 and 16, 17 and respective intermediate metallic portions 18 and 19. The metallic sections 18 and 19 serve as output electrodes for supplying current to a suitable load 20 connected therebetween via respective leads 21 and 22.

In order to provide a magnetic field perpendicular to the top 13 and the bottom 14 of the duct, the north pole of a magnet 23 is positioned above the duct while the south pole of a magnet 24 is located below the duct.

FIG. 3 is a sectional end view of the duct 10 and magnets 23 and 24 taken along the line 3—3. The numerals used in FIG. 3 identify the same components as in FIGS. 1 and 2.

The duct 10 is disposed between the mixing chamber 11 and the separator 12 and liquid metal slug-flow is in a direction from the mixing chamber towards the separator through the duct. The nonconductive gas 9 is recirculated from the separator 12 to the mixing chamber 11 by means of a gas conduit 25 in which there is disposed a pump 26 such as an air compressor. In order to heat the nonconductive gas to increase the kinetic energy thereof to the desired level, a heat exchanger 27 is inserted in the gas conduit. The heat exchanger may be any suitable device for heating the gas, as for example, a nuclear reactor. A regulating means such as throttle valve 28 is disposed in the gas conduit 26 intermediate the heat exchanger 27 and the mixing chamber to control the rate of supply or flow rate of nonconductive gas entering the mixing chamber. By adjusting the throttle valve 28, the desired liquid metal to gas ratio to produce slug flow can be achieved.

In order to recirculate the liquid metal 8 through the system, the separator 12 is connected through a liquid carrying conduit 29 to a jet 30 disposed in the mixing chamber 11. Connected serially with the liquid carrying conduit are a condenser 31, a pump 32 and a heat exchanger 33. The condenser liquifies any metal which is in mist form in order to maintain efficient operation of the pump 32 which forces the liquid metal through the heat exchanger 33 and out of the jet 30 under pressure. The pump 32 and the size of the conduit 29 determine the liquid metal flow rate. The heat exchanger 33 increases the kinetic energy of the liquid metal and, as in the case of heat exchanger 27, may be a nuclear reactor device.

To insure that any liquid metal in mist form is separated from the nonconductive gas 9 before the latter is recirculated, a cooling means such as cooling coil 46 may be mounted in the separator 12. Coolant is directed through the cooling coil 46 from a coolant supply 47. With this condenser arrangement, any metallic mist entering the separator will condense on the coil 46 and then drop into the liquid metal 8 in the lower end of the separator.

By providing a cooling coil 46 and a coolant supply 47 of high cooling capacity, the condenser 31 is no longer needed and may be removed from the liquid metal conduit 29.

Operation of the foregoing MHD structure will now be explained.

The liquid metal 8 and the nonconductive gas 9 used in the instant invention are mercury and nitrogen respectively. However, it will be understood that any liquid metal and nonconductive gas which are not mutually reactive may be used.

The liquid metal 8 is drawn out of the liquid outlet at the bottom of the separator 12 and through the condenser 31 by the pump 32. The condenser 31 substantially eliminates any traces of mist in the liquid metal flowing toward the pump 32. The pump 32 forces the liquid metal through the heat exchanger 33 where it is heated to increase its kinetic energy. The liquid metal emerges from the heat exchanger in the form of bubbles 34 which are injected into the mixing chamber 11 from the jet 30 as a metallic mist 35.

Concurrently with the above-described flow of liquid metal, the nonconductive gas is pumped under pressure from the gas outlet at the top of the separator 12 to the mixing chamber 11 through the gas conduit 25 by means of the pump 26. In passing through the heat exchanger 27, the gas is heated to increase the kinetic energy thereof.

The flow rate of the gas entering the mixing chamber is controlled by the throttle valve 28 positioned in the conduit 25. The throttle valve is adjusted to proportion the gas-to-liquid metal ratio entering the mixing chamber to produce slug flow as hereinafter described. For optimum performance, the throttle valve 28 should be adjusted to provide approximately equal flow rates of liquid metal and nonconductive gas.

The gas-metallic mist mixture formed in the mixing chamber progresses into the duct 10 by virtue of its high kinetic energy. As the mixture enters the duct 10, the droplets of metallic mist begin to coalesce due to the magnetic field established by the magnets 23 and 24. At some point in the mixture, a sufficient number of mist droplets will coalesce to provide a metallic bridge between the electrodes 18 and 19 which are shown in FIG. 2. As soon as the bridge forms, other metallic mist droplets concentrate around the bridge thereby forming a liquid metal slug as shown at 36. The slugs preceding slug 36 through the duct 10 are identified by the numerals 37, 38 and 39.

As the slug 36 moves through the magnetic field it generates a potential difference between the electrodes 18 and 19. Consequently, referring to FIG. 2, it will be seen that current can flow from electrode 19 through lead 21, D-C load 20, lead 22, electrode 18 and the slug 36 returning to electrode 19.

Because of the formation of the metallic mist into slugs, the nonconductive gas exists in pockets separating the slugs. The kinetic energy of these gas pockets aids the movement of the slugs through the magnetic field.

As the slugs progress through the magnetic field their respective velocities decrease as a result of the work done in generating the potential difference between the electrodes 18 and 19. Consequently, the volumes of the gas pockets decrease as they progress through the magnetic field.

The slugs and the gas pockets after traversing the magnetic field flow into the separator 12. When the instant invention is operated in a gravitational field, the liquid metal slugs drop into the liquid contained in the separator while the gas pockets mix with the gas confined to the upper portion of the separator. From this point the liquid metal and the gas are recirculated as previously described. If the MHD generator is to be operated under zero gravity conditions, as for example in space, a cyclone type separator may be advantageously used.

FIG. 4 illustrates a modification of the device embodying the invention with regard to the output electrodes.

As shown in FIG. 4 which is a top sectional view of the duct 10, three pairs of output electrodes 40a and 40b, 41a and 41b, and 42a and 42b may be provided. The pairs of electrodes are connected to respective utilization or load devices 43, 44 and 45 to supply electrical power thereto. With this arrangement, a pulse of electrical power will be supplied to the load 43 when a slug passes between the electrodes 40a and 40b. Similarly, a power pulse is supplied to the load 44 when a slug passes between the electrodes 41a and 41b and to the load 45 when a slug passes between the electrodes 42a and 42b, thus rendering possible the use of a transformer.

With the arrangement shown in FIG. 4, the separation between the electrode pairs must be substantially greater than the slug lengths to prevent the slugs from shorting the electrode pairs together. If such shorting were to occur, a D-C output of relatively constant magnitude would be produced as in the case of the electrode structure shown in FIG. 2.

It is understood that changes and modifications may be made to the above described MHD generator without departing from the spirit and scope of the invention as set forth in the claims appended hereto.

What is claimed is:

1. In a magnetohydrodynamic generator for supplying electrical power to a load, in combination, a duct having output electrode means adapted for connection to the load, magnetic means adjacent to said duct to produce a magnetic field therein, means for supplying a nonconductive gas of high kinetic energy to one end of said duct under pressure, means for supplying a liquid metal mist of high kinetic energy to said one end of said duct under pressure, the supply rates of said gas and said liquid metal mist being so proportioned that the liquid metal mist coalesces into slugs in said duct due to the magnetic field, the formation of said slugs creating pockets of said nonconductive gas between said slugs to aid the movement of said slugs through the magnetic field, said slugs and gas pockets exhausting from the other end of said duct.

2. The structure as set forth in claim 1 in which said electrode means comprises a plurality of separated electrode pairs, each pair being connected to a different load.

3. The apparatus as set forth in claim 1 in which the liquid metal mist is mercury and the nonconductive gas is nitrogen.

4. The structure as set forth in claim 1 and including regulating means connected in controlling relationship to said means for supplying nonconductive gas to said one end of said duct whereby the rate of supply of said nonconductive gas may be varied to produce the desired slug flow in said duct, 5. The structure as set forth in claim 1 and including separator means in communication with said other end of said duct for separating said liquid metal from said nonconductive gas, said separator means having a liquid outlet and a gas outlet each of which is connected in communication with said one end of said duct whereby said liquid metal and said nonconductive gas are recirculated through said duct.

6. The structure as set forth in claim 5 and including condensing means operatively connected to said separator means to condense metallic mist exhausted into said separator means from said duct thereby separating said metallic mist from said nonconducting gas.

7. In an electrical generator, in combination, a duct having a top and a bottom of electrically nonconductive material and sides of electrically conductive material which serves as output electrodes, magnetic means positioned to direct magnetic lines of force perpendicularly to the top and bottom of said duct, mixing chamber means in communication with said duct, jet means disposed in said mixing chamber means, separator means communicating with said duct and containing a supply of liquid metal and a supply of nonconductive gas and having a gas outlet and a liquid outlet, liquid conduit means connected between said liquid outlet and said jet means to direct liquid metal from said separator to said jet means, first heating means disposed in said liquid conduit means to increase the kinetic energy of the liquid metal, first pump means disposed in said liquid metal conduit to deliver the liquid metal to said jet means under pressure whereby the liquid metal will be emitted from said jet means as a mist, gas conduit means connected between said mixing chamber means and said gas outlet to direct the nonconductive gas from said separator means to said mixing chamber means, second heating means disposed in said gas conduit to increase the kinetic energy of the nonconductive gas, second pump means disposed in said gas conduit to deliver said gas to said mixing chamber under pressure, throttle valve means disposed in said gas conduit whereby the flow of said nonconductive gas may be adjusted to a rate at which the liquid mist will coalesce into slugs in said duct due to the influence of the magnetic field, said slugs being separated by pockets of nonconductive gas, the kinetic energy of which aids the movement of the slugs through the magnetic field.

8. The apparatus as set forth in claim 6 in which the liquid metal is mercury and the nonconductive gas is nitrogen.

9. The structure as set forth in claim 6 and including a source of coolant, a cooling coil mounted in said separator means and connected to said coolant supply to receive coolant therefrom, said cooling coil causing metallic mist entering said separator means to condense and mix with said liquid metal supply.

10. The structure as set forth in claim 7 in which said duct sides comprise alternate, electrically conductive and nonconductive sections to provide a plurality of electrode pairs, each electrode pair being connected to a separate load.

References Cited

UNITED STATES PATENTS

| | | | |
|---|---|---|---|
| 2,362,283 | 11/1944 | McCollum | 310—11 |
| 3,320,444 | 5/1967 | Prem | 310—11 |
| 3,294,989 | 12/1966 | Eichenberger | 310—11 |

DAVID X. SLINEY, *Primary Examiner.*